United States Patent
Kole et al.

(10) Patent No.: US 12,521,816 B2
(45) Date of Patent: Jan. 13, 2026

(54) SCANNING LASER APPARATUS ADDRESSING TWO WORKSTATIONS

(71) Applicant: Rofin-Sinar Technologies LLC, Plymouth, MI (US)

(72) Inventors: Matthew R. Kole, Troy, MI (US); David Beatson, Plymouth, MI (US)

(73) Assignee: Rofin-Sinar Technologies LLC, Plymouth, MI (US)

( * ) Notice: Subject to any disclaimer, the term of this patent is extended or adjusted under 35 U.S.C. 154(b) by 801 days.

(21) Appl. No.: 17/868,625

(22) Filed: Jul. 19, 2022

(65) Prior Publication Data
US 2024/0024982 A1 Jan. 25, 2024

(51) Int. Cl.
| | | |
|---|---|---|
| *B23K 26/082* | (2014.01) | |
| *B23K 26/08* | (2014.01) | |
| *G02B 26/08* | (2006.01) | |
| *G02B 26/10* | (2006.01) | |

(52) U.S. Cl.
CPC ........ *B23K 26/082* (2015.10); *B23K 26/0823* (2013.01); *G02B 26/0816* (2013.01); *G02B 26/10* (2013.01)

(58) Field of Classification Search
CPC ............ B23K 26/0652; B23K 26/0673; B23K 26/0823; B23K 26/082
See application file for complete search history.

(56) References Cited

U.S. PATENT DOCUMENTS

| | | | |
|---|---|---|---|
| 4,701,591 A | 10/1987 | Masaki et al. | |
| 6,058,132 A * | 5/2000 | Iso | B23K 26/066 372/15 |
| 2007/0053039 A1 | 3/2007 | Andreasch | |
| 2008/0035616 A1 * | 2/2008 | Muller | B41J 2/471 219/121.72 |
| 2023/0191531 A1 * | 6/2023 | Naito | B23K 26/0665 372/9 |

FOREIGN PATENT DOCUMENTS

| | | | | |
|---|---|---|---|---|
| DE | 102013114489 B3 * | 4/2015 | ........ | B23K 26/0876 |
| EP | 3603871 A1 | 2/2020 | | |
| WO | WO-2021245861 A1 * | 12/2021 | ........... | B23K 26/032 |

OTHER PUBLICATIONS

International Search Report and Written Opinion received for PCT Patent Application No. PCT/US2023/070326, mailed on Nov. 22, 2023, 13 pages.

\* cited by examiner

*Primary Examiner* — Thien S Tran
(74) *Attorney, Agent, or Firm* — Morrison & Foerster LLP

(57) ABSTRACT

A scanning laser apparatus for alternately processing two workstations includes a 2D laser beam scanner and a roof reflector. The roof reflector has two reflective surfaces located on the left and right sides, respectively, of the roof "ridge". The laser beam scanner directs the laser beam to either one of the left and right reflective surfaces of the roof reflector. When the laser beam scanner directs the laser beam to the left (or right) reflective surface, the left (or right) reflective surface reflects the laser beam toward a workstation on the left (or right) side of the roof ridge. The roof reflector divides the field of view of the laser beam scanner between the workstations. While a workpiece is being removed from or mounted in the left workstation, another workpiece may undergo scanning laser processing in the right workstation, and vice versa, thereby facilitating high throughput.

21 Claims, 6 Drawing Sheets

SCANNING LASER APPARATUS ADDRESSING TWO WORKSTATIONS

TECHNICAL FIELD OF THE INVENTION

The present invention relates to scanning laser processing of many workpieces. The present invention relates in particular to minimizing idle time of the scanning laser apparatus between processing individual workpieces.

DISCUSSION OF BACKGROUND ART

Beams of laser radiation are increasingly used to machine, weld, or otherwise work a wide range of materials, including metals, plastics, and glass. The laser processes include cutting, scribing, drilling, marking, welding, heat treating, and annealing. Conventional mechanical machining as well as conventional welding tend to produce unwanted defects such as micro-cracks that may propagate when a processed workpiece is stressed, thereby degrading and weakening the processed workpiece. Laser processing minimizes such unwanted defects, is generally cleaner, and may be performed with greater accuracy. Laser machining uses a focused laser beam to produce precise cuts and holes (or other modifications), having high quality edges and walls, while minimizing the formation of unwanted defects. In laser welding, a focused laser beam locates each weld spot or seam precisely, while minimizing collateral heating. In laser marking, a focused laser beam removes or oxidizes material to form a permanent visible mark with greater accuracy and speed than conventional mechanical technology.

A typical laser processing apparatus includes a laser head that emits a converging laser beam, and a workstation that holds a workpiece at the focus of the laser beam. The laser head often includes a beam scanner to steer the laser beam to different locations on the workpiece. Alternatively, or in combination therewith, the workpiece and laser head may be mechanically moved relative to each other using robotic tooling or motorized stages. The preferred approach to changing the positional relationship between the workpiece and the laser beam depends on the geometry of the workpiece and laser processing task to be performed. For example, in systems tailored to process rod-shaped workpieces, the workstation may include a rotation stage that rotates the workpiece about its longitudinal axis to expose different sides of the workpiece to the laser beam.

A common optical design for laser beam scanners is based on one or more galvanometer-actuated mirrors ("galvo mirrors") and a focusing objective. When two-dimensional (2D) scanning is required, two galvo mirrors with orthogonal sweep angles are arranged in series. The galvo mirror(s) may be placed before or after the focusing objective. In scanning laser heads with the galvo mirror(s) placed before the focusing objective, the focusing objective may be designed to achieve a common working distance across the scan field. In such flat-field scanning laser heads, the focusing objective may further be telecentric such that the laser beam propagation direction toward the workpiece is at least nearly parallel to the optical axis of the focusing objective regardless of the scan angle(s) of the galvo mirror(s). With this configuration, the laser beam parameters are relatively consistent across the scan field.

For some types of workpieces and associated laser processing tasks, the time needed to remove a processed workpiece and mount an unprocessed workpiece is significant compared to the actual laser processing time. During this removing and mounting time, the scanning laser apparatus sits idle. Idle time of the scanning laser apparatus may be reduced by robotically shuttling the scanning laser apparatus between different workstations. In situations where the actual laser source represents the majority of the cost of the laser apparatus or where shuttling of the scanning laser apparatus is impractical or too slow, gains may be made by arranging two or more different laser beam scanners and associated workstations to timeshare a single laser source. Such timesharing does, however, add complexity to the optical setup. A different approach to timesharing is disclosed by Andreasch in U.S. Patent Application Publication No. 2007/0053039. In Andreasch's approach, the conventional laser beam scanner is replaced by a "laser beam deflecting device". Andreasch's laser beam deflecting device is arranged to receive a laser beam from a laser source and includes a rotatable mirror that can be mechanically manipulated to deflect the laser beam toward either one of two different workstations positioned on two opposite sides of the laser beam deflecting device. The laser beam deflecting device is further adjustable to facilitate scanning.

SUMMARY OF THE INVENTION

Disclosed herein is a scanning laser apparatus that uses a roof reflector to direct a laser beam from a single 2D laser beam scanner to either one of two different workstations. The roof reflector allows the single laser beam scanner to alternately address the two workstations, thereby reducing costly idle time of the laser source and scanner during removal and mounting of the workpieces. While a workpiece is being removed from or loaded into one of the two workstations, or otherwise manipulated, the laser beam may be utilized by the other workstation.

The roof reflector has two reflective surfaces located on the left and right sides, respectively, of the roof "ridge". The roof reflector intercepts the laser beam emitted by the laser scanner, and the scanning functionality of the laser beam scanner is used to steer the laser beam to either one of the left and right reflective surfaces of the roof reflector. When the laser beam scanner steers the laser beam to the left reflective surface, the left reflective surface reflects the laser beam toward a workstation on the left side of the roof ridge. When the laser beam scanner steers the laser beam to the right reflective surface, the right reflective surface reflects the laser beam toward a workstation on the right side of the roof ridge. In this manner, the roof reflector divides the field of view (FOV) of the laser beam scanner between the two workstations. While the laser beam is directed toward one workstation, the scanning functionality of the laser beam scanner is utilized to scan the corresponding workpiece with the laser beam.

The laser beam scanner may be a conventional 2D laser beam scanner, for example configured with galvo mirrors and, optionally, a focusing objective. In this case, the roof reflector extends the functionality of the conventional laser beam scanner to alternately address two different workstations. This capability to alternately address two workstations may be achieved at low cost and without incorporating additional moving parts, and associated controls. The roof reflector may be rigid and stationary, at least after completion of an initial alignment. It is also not necessary to modify the conventional 2D laser beam scanner. However, since the roof reflector divides the FOV of the laser beam scanner, each workstation benefits from only a portion of the laser beam scanner's full FOV. For laser beam scanners with a rotationally symmetric FOV, the FOV portion available for each workstation is elongated in the dimension parallel to the roof ridge. Thus, the present approach is particularly well suited for scanning laser processing of elongated workpieces, such as rods and tubes.

In one aspect, a scanning laser apparatus for alternately addressing two workstations includes a 2D laser beam scanner for steering a propagation direction of a laser beam within a field of view of the laser beam scanner. The scanning laser apparatus also includes a roof reflector positioned to intercept the laser beam steered by the laser beam scanner. The roof reflector includes first and second reflective surfaces positioned on first and second sides, respectively, of a center plane of the roof reflector. The center plane divides the field of view into first and second field-of-view portions so as to allow said steering of the laser beam to direct the laser beam to either the first or the second reflective surface. Each of the first and second reflective surfaces is oriented to reflect the laser beam away from the center plane. The laser beam scanner is configured to adjust the propagation direction of the laser beam, as incident on the roof reflector, in dimensions both parallel and perpendicular to the center plane.

In another aspect, a scanning laser processing method for alternately addressing two workstations includes a step of directing a laser beam to a first reflective surface of a roof reflector. The first reflective surface is positioned on a first side of a center plane of the roof reflector. The first reflective surface reflects the laser beam away from the center plane to irradiate a first workpiece mounted in a first workstation on the first side of the center plane. The method further includes, while directing the laser beam to the first reflective surface, varying the propagation direction of the laser beam toward the roof reflector, both parallel and orthogonally to the center plane, to scan at least a portion of the first workpiece with the laser beam. In addition, the method includes, after the step of directing the laser beam to the first reflective surface, a step of directing the laser beam to a second reflective surface of the roof reflector. The second reflective surface is positioned on a second side of the center plane. The second reflective surface reflects the laser beam away from the center plane to irradiate a second workpiece mounted in a second workstation on the second side of the center plane. The method also includes, while directing the laser beam to the second reflective surface, varying the propagation direction of the laser beam toward the roof reflector, both parallel and orthogonally to the center plane, to scan at least a portion of the second workpiece with the laser beam.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figure 1:
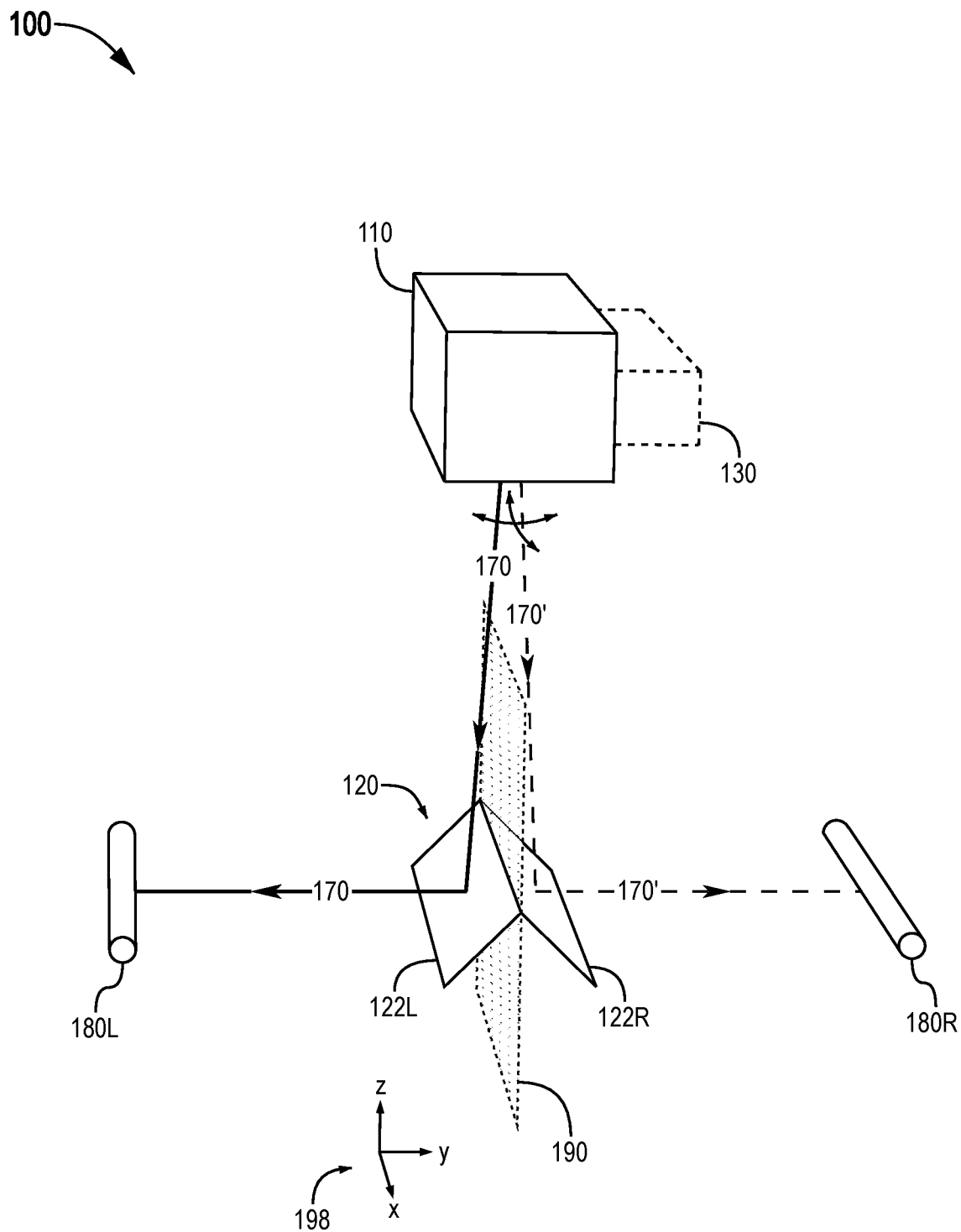
FIG. 1 illustrates a scanning laser apparatus that uses a roof reflector to alternately address two workstations, according to an embodiment.

Referring now to the drawings, wherein like components are designated by like numerals, FIG. 1 illustrates one scanning laser apparatus 100 for alternately addressing two workstations. Apparatus 100 includes a 2D laser beam scanner 110 and a roof reflector 120. Roof reflector 120 includes two planar, reflective surfaces 122L and 122R respectively located on the left and right sides of a virtual center plane 190 of roof reflector 120. Center plane 190 coincides with the ridge of the roof-shape formed by reflective surfaces 122L and 122R and is parallel to the xz-plane of a cartesian coordinate system 198. (Herein, reference to x-, y-, and z-axes and corresponding dimensions, planes, and directions refers to coordinate system 198.) The propagation direction of laser beam 170 from scanner 110 to roof reflector 120 is generally in the negative z-direction, although not necessarily exactly parallel to the z-axis. Center plane 190 divides the FOV of scanner 110 into left and right FOV portions. Scanner 110 is capable of adjusting the propagation direction of laser beam 170, toward roof reflector 120, in both x- and y-dimensions. Apparatus 100 may further include a laser source 130 that generates laser beam 170. Alternatively, apparatus 100 may be configured to receive laser beam 170 from an external laser source.

In operation, scanner 110 steers the propagation direction of laser beam 170 toward roof reflector 120. Scanner 110 directs laser beam 170 to either one of reflective surfaces 122L and 122R. When scanner 110 directs laser beam 170 to reflective surface 122L (see solid propagation path labeled 170), reflective surface 122L reflects laser beam 170 away from center plane 190 in the negative y-direction. In this fashion, scanner 110 may direct laser beam 170 to irradiate a workpiece 180L located on the left side of center plane 190. Using its 2D scanning functionality, scanner 110 is capable of steering laser beam 170 to scan both x- and z-dimensions of workpiece 180L. In a similar manner, scanner 110 may instead direct laser beam 170 toward reflective surface 122R to irradiate and scan a workpiece 180R located on the right side of center plane 190 (see dashed propagation path labeled 170').

Figure 2:
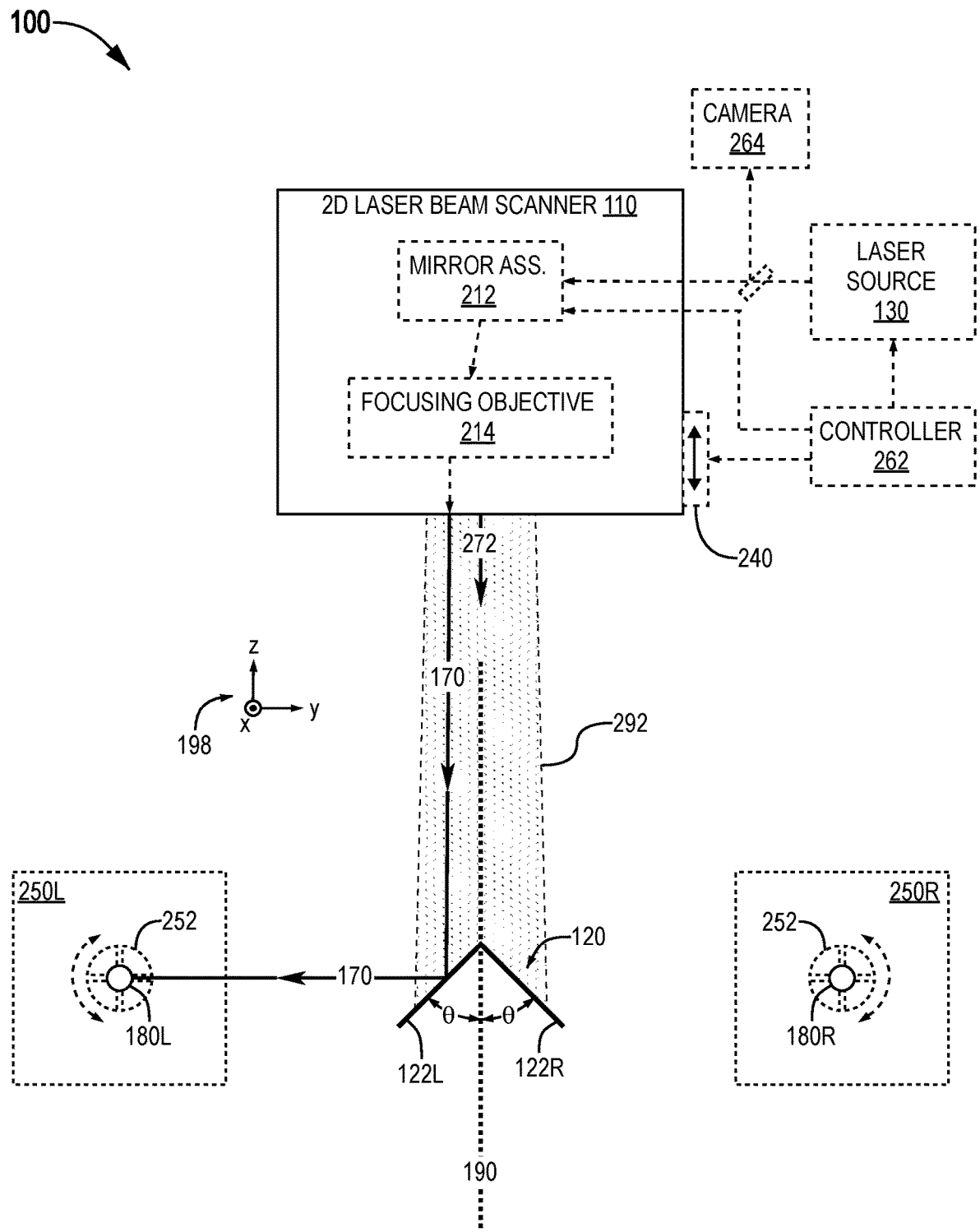
FIG. 2 is another view of the FIG. 1 laser apparatus, showing further detail.

FIG. 2 is a side view of apparatus 100 showing further detail. Each of reflective surfaces 122L and 122R is oriented at an angle $\theta$ to center plane 190. In the depicted embodiment, $\theta$ is 45 degrees or at least approximately 45 degrees (e.g., between 40 and 50 degrees). This value of $\theta$ maximizes the distance between workpieces 180L and 180R, which may be useful for accommodating workstations to hold and handle the workpieces. Apparatus 100 is also compatible with other values of $\theta$ to irradiate workpieces located closer to or farther away from scanner 110. For example, more generally, $\theta$ may be in the range between 20 and 70 degrees. The optimal value of $\theta$ may depend on spatial constraints such as the size and shape of the workpieces and associated workstations. For example, the three pairwise distances between workpiece 180L, workpiece 180R, and scanner 110 may be equalized by setting θ close to 30 degrees, e.g., between 25 and 35 degrees. This may be helpful when the workpieces are large. Reflective surfaces 122L and 122R may be mirror images of each other, with respect to center plane 190. It is assumed here that reflective surfaces 122L and 122R are oriented at the same angle θ to center plane 190. The description is readily extended to embodiments where reflective surfaces 122L and 122R are at different respective angles θ to center plane 190.

As depicted in FIG. 2, reflective surfaces 122L and 122R are oriented such that their normal vectors are parallel to the yz-plane. This is equivalent to angle θ being parallel to the yz-plane. The propagation directions of laser beam 170 from roof reflector 120 toward workpieces 180L and 180R are therefore generally along the y-axis. If necessitated by spatial constraints, for example, reflective surfaces 122L and 122R may be oriented at a tilt in the negative or positive x-directions, corresponding to their normal vectors being oblique to the yz-plane. If reflective surfaces 122L and 122R are tilted in this manner, the propagation directions of laser beam 170 from roof reflector 120 toward workpieces 180L and 180R are generally oblique to the y-axis. Hereinafter, it is assumed that the normal vectors of reflective surfaces 122L and 122R, and their embodiments, are parallel to the yz-plane. The description is readily generalized to tilted orientations of the reflective surfaces.

Scanner 110 can steer the propagation direction of laser beam 170 within the FOV 292 (depicted as dashed boundary lines) of scanner 110. For the purpose of symmetry between scanning laser processing on the left and right sides of center plane 190, a central propagation direction 272 (i.e., a propagation direction at the middle of FOV 292) may be coplanar with center plane 190. In such embodiments, central propagation direction 272 may be parallel to the z-axis. Scanner 110 may include a mirror assembly 212 adjustable to steer the propagation direction of laser beam 170 within FOV 292. Mirror assembly 212 may include one or more galvo mirrors. Scanner 110 may also include a focusing objective 214 that focuses laser beam 170. In a typical scenario, workpieces 180L and 180R are positioned at, or near, the focus of laser beam 170. In the depicted embodiment where mirror assembly 212 precedes focusing objective 214, focusing objective 214 may be telecentric. In another embodiment, focusing objective 214 precedes mirror assembly 212. Again, for the purpose of symmetry between scanning laser processing on the left and right sides of center plane 190, the optical axis of focusing objective 214 may be coplanar with center plane 190. This will typically correspond to center plane 190 dividing FOV 292 evenly into the left and right portions.

Conventional 2D laser beam scanners most often have a rotationally symmetric FOV. In embodiments where FOV 292 is rotationally symmetric, or at least approximately so, the FOV portion available to each individual one of workpieces 180L and 180R is elongated in one dimension. Specifically, as viewed from either one of workpieces 180L and 180R, the portion of FOV 292, available to the workpiece, is elongated in the x-dimension as compared to the z-dimension. Such embodiments of apparatus 100 are particularly well suited for scanning laser processing of rod- or tube-shaped workpieces, or other elongated workpieces, oriented with their longer dimension approximately parallel to the x-dimension.

Apparatus 100 may be integrated with two workstations 250L and 250R to form a dual-workstation scanning laser apparatus. Each of workstations 250L and 250R receives a corresponding one of workpieces 180L and 180R and holds this workpiece during scanning laser processing with laser beam 170. Optionally, each of workstations 250L and 250R includes one or more rotation or translation stages that position the corresponding workpiece as needed for the laser processing task.

In the example scenario depicted in FIGS. 1 and 2, each of workpieces 180L and 180R is a rod or tube oriented with its longitudinal axis parallel to the x-axis. Each of workstations 250L and 250R may include a rotation stage 252 that rotates the corresponding workpiece about the x-axis to allow scanning laser processing of all sides of the workpiece. When the rod- or tube-shaped workpiece is cylindrical, such rotation does not affect the working distance between scanner 110 and the workpiece. As a result, a focus of laser beam 170 on the workpiece may be maintained during rotation of the workpiece with no need to correct the focus location. For non-cylindrical rod- or tube-shaped workpieces, keeping laser beam 170 focused on the workpiece during rotation of the workpiece requires correcting the working distance between scanner 110 and the workpiece. For this purpose or, more generally, to allow focus adjustment in apparatus 100, scanner 110 may include an internal focus adjustment mechanism, be equipped with a 5-axis galvo scanner, or be coupled to an external translation stage 240. Translation stage 240 is operable to adjust the distance between scanner 110 and roof reflector 120. Translation stage 240 may be motorized.

Certain embodiments of apparatus 100 include a controller 262 that controls the beam steering by scanner 110. For example, controller 262 may adjust mirror assembly 212 to achieve a desired propagation direction of laser beam 170 within FOV 292. Controller 262 may also control translation stage 240 to adjust the working distance between scanner 110 and workpiece 180L/180R. Controller 262 may include a computer configured or operable to effectuate a certain beam steering scheme by scanner 110.

In one exemplary beam steering scheme performed by scanner 110, for example according to control signals received from controller 262, scanner 110 first directs laser beam 170 to reflective surface 122L so as to irradiate workpiece 180L mounted in workstation 250L. While scanner 110 directs laser beam 170 to reflective surface 122L, scanner 110 varies the propagation direction of laser beam 170, toward roof reflector 120, to scan at least a portion of workpiece 180L with laser beam 170. Scanner 110 varies the propagation direction of laser beam 170 both parallel and orthogonally to center plane 190 to perform 2D scanning of workpiece 180L. While scanner 110 is engaged irradiating workpiece 180L, workpiece 180R may be mounted or repositioned in workstation 250R. After steering laser beam 170 to irradiate and scan workpiece 180L, scanner 110 directs laser beam 170 to reflective surface 122R to irradiate workpiece 180R. Scanner 110 again varies the propagation direction of laser beam 170, toward roof reflector 120, both parallel and orthogonally to center plane 190. Scanner 110 thereby performs 2D scanning of at least a portion of workpiece 180R. While scanner 110 is engaged irradiating workpiece 180R, workpiece 180L may be removed from workstation 250L or repositioned in workstation 250L for additional laser processing. Without departing from the scope hereof, irradiation of either one of workpieces 180L and 180R may be discontinuous. Optionally, during irradiation of either one of workpieces 180L and 180R, the corresponding workstation manipulates the position the workpiece. For example, in the case of rod- or tube-shaped workpieces, rotation stage 252 may rotate the workpiece. Additionally, translation stage 240 may adjust the working distance between scanner 110 and the workpiece to achieve and maintain a laser beam focus on the workpiece.

Apparatus 100 may include a camera 264 that views workpieces 180L and 180R through scanner 110 and via roof reflector 120. Camera 264 may (a) serve as a quality control tool, (b) be used to check that laser beam 170 is focused on the workpieces, and/or (c) provide imaging feedback used to actively control aspects of the laser processing task.

Although not shown in FIGS. 1 and 2, apparatus 100 may also include an air knife, or other gas flow mechanism, to keep the surfaces of roof reflector 120 that interact with laser beam 170 free of debris, dust, and other contamination.

Figure 3:
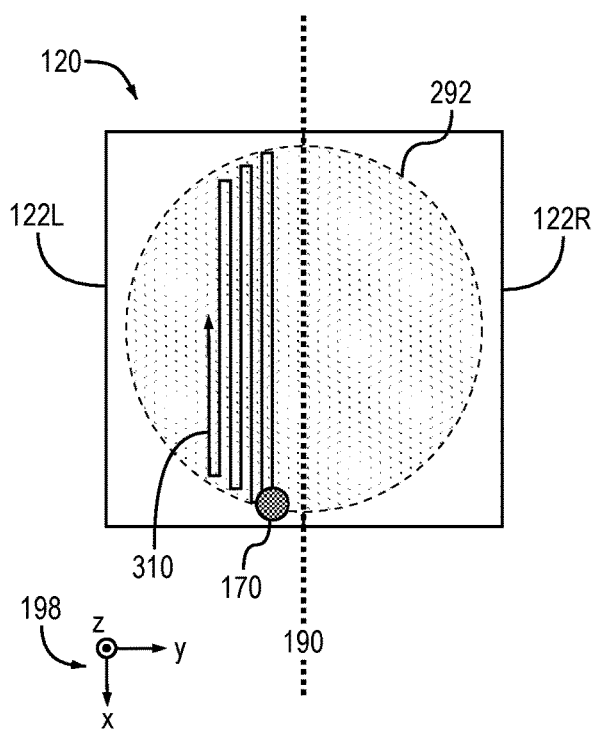
FIG. 3 is a top view of the roof reflector of the FIG. 1 laser apparatus.

FIG. 3 is a top view of roof reflector 120, illustrating one example of laser beam scanning in apparatus 100. In this example, reflective surfaces 122L and 122R are rectangular, FOV 292 is rotationally symmetric and centered on roof reflector 120, and roof reflector 120 is sized to contain the entire footprint of FOV 292. In scenarios where FOV 292 is larger than needed for the laser processing task to be performed, roof reflector 120 may be sized such that some of FOV 292 falls outside roof reflector 120.

In practical implementations, the usable area of roof reflector 120 is likely reduced by edge imperfections, both along the outer periphery of roof reflector 120 and along the ridge between reflective surfaces 122L and 122R (at center plane 190). Thus, in implementations where FOV 292 is split symmetrically between reflective surfaces 122L and 122R, the FOV portion available to each of workstations 250L and 250R can approach, but generally not reach, 50 percent. In addition, the non-zero transverse extent of laser beam 170 must be considered when planning a scan within the usable area of roof reflector 120. In a typical scenario, the waist of laser beam 170 coincides with the workpiece, and laser beam 170 is therefore defocused when incident on roof reflector 120. FIG. 3 shows an exemplary scan pattern 310 to be traced by laser beam 170 on reflective surface 122L. Scan pattern 310 is positioned away from both center plane 190 and the periphery of roof reflector 120, such that the full transverse extent of laser beam 170 (at least up to one or more multiples of its $1/e^2$ intensity distribution) remains within the usable area of reflective surface 122L. This prevents (a) a portion of laser beam 170 from being incident on reflective surface 122R instead of reflective surface 122L, (b) undesirable light scattering from edges of roof reflector 120 and the ridge between reflective surfaces 122L and 122R, and (c) loss of laser light due to possibly reduced reflection efficiency near the edges of reflective surface 122L.

Figure 4:
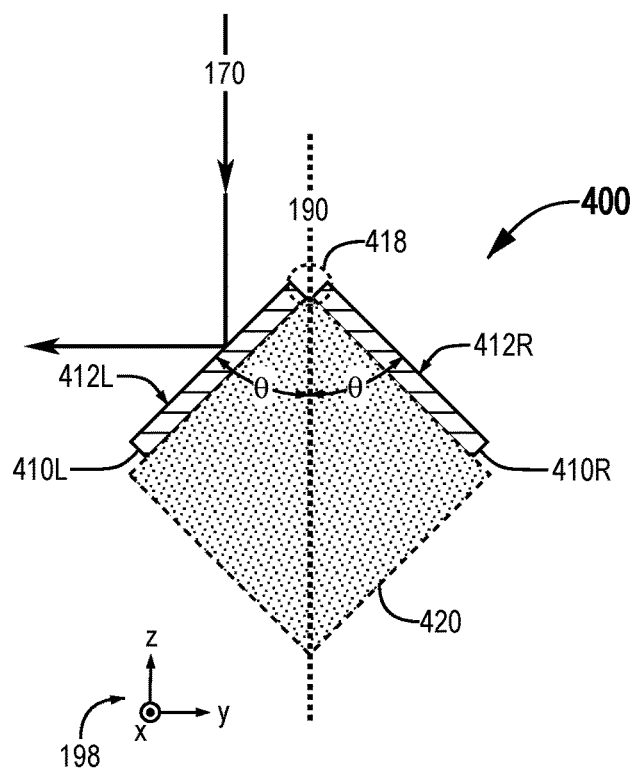
FIG. 4 illustrates a roof reflector based on a mirror pair, according to an embodiment.

FIG. 4 is a sideview of one exemplary roof reflector 400 based on a mirror pair. Roof reflector 400 is an embodiment of roof reflector 120 that includes two mirrors 410L and 410R positioned on the left and right sides, respectively, of center plane 190. Mirror 410L has a reflective surface 412L, and mirror 410R has a reflective surface 412R. In apparatus 100, reflective surfaces 412L and 412R face away from center plane 190 and toward laser beam 170 as incident from scanner 110. Each of reflective surfaces 412L and 412R may include a reflective coating. Mirrors 410L and 410R may be mounted on a common mount 420 or on two separate mounts (not depicted in FIG. 4).

When using standard-cut mirror substrates, a gap 418 exists between reflective surfaces 412L and 412R at the ridge of roof reflector 400. Gap 418 reduces the usable area of roof reflector 400, and the corresponding portion of FOV 292 of scanner 110 is not available for scanning of either one of workpieces 180L and 180R.

Figure 5:
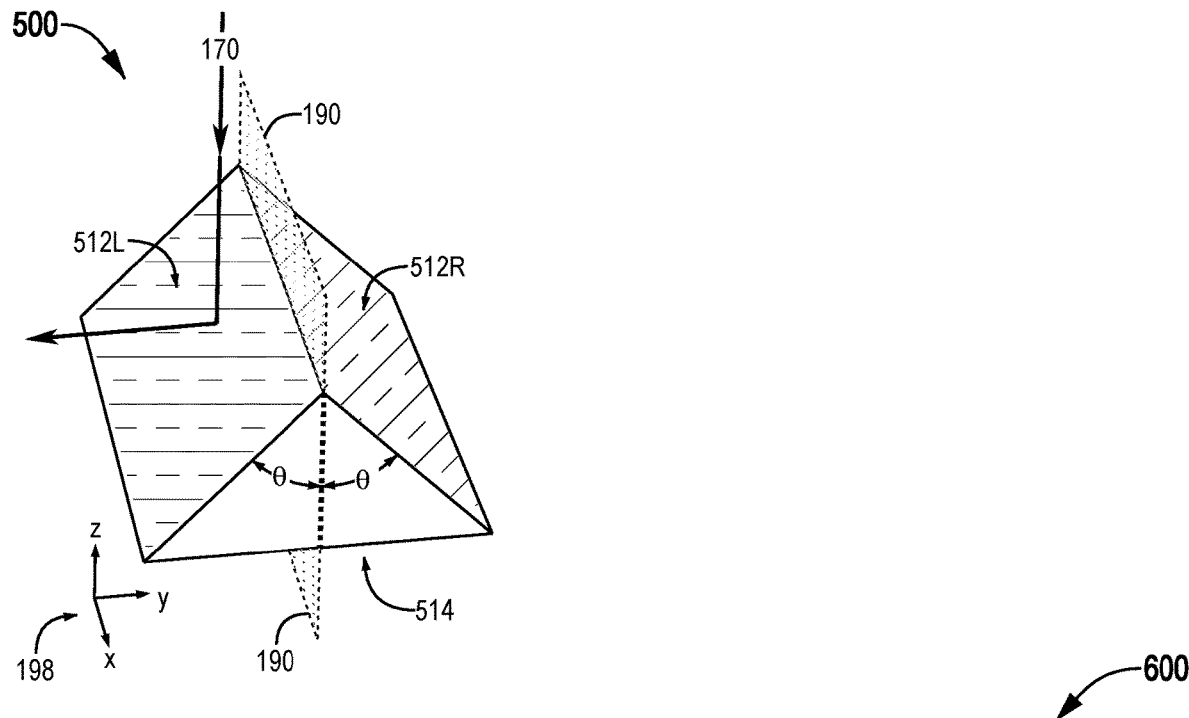
FIG. 5 illustrates a roof reflector in the shape of a triangular prism, according to an embodiment.

FIG. 5 illustrates one exemplary roof reflector 500 in the shape of a triangular prism. Roof reflector 500 is an embodiment of roof reflector 120. Roof reflector 500 has three lateral faces: a reflective surface 512L on the left side of center plane 190, a reflective surface 512R on the right side of center plane 190, and a third lateral face 514 crossing center plane 190. Face 514 is hidden from view in FIG. 5 but indicated with an arrow. Face 514 faces in the negative z-direction and may (but does not need to) be orthogonal to center plane 190, as shown in FIG. 5. In apparatus 100, reflective surfaces 512L and 512R face away from center plane 190 and toward laser beam 170 as incident from scanner 110. Each of reflective surfaces 512L and 512R may include a reflective coating.

As compared to roof reflector 400 implemented with standard-cut mirror substrates, roof reflector 500 reduces the portion of FOV 292 rendered unusable at the ridge between the two reflective surfaces. Still, a narrower, central strip of FOV 292 may coincide with a rounded edge between reflective surfaces 512L and 512R and/or, when reflectivity is achieved by reflective coatings, be outside coated portions of reflective surfaces 512L and 512R.

Figure 6:
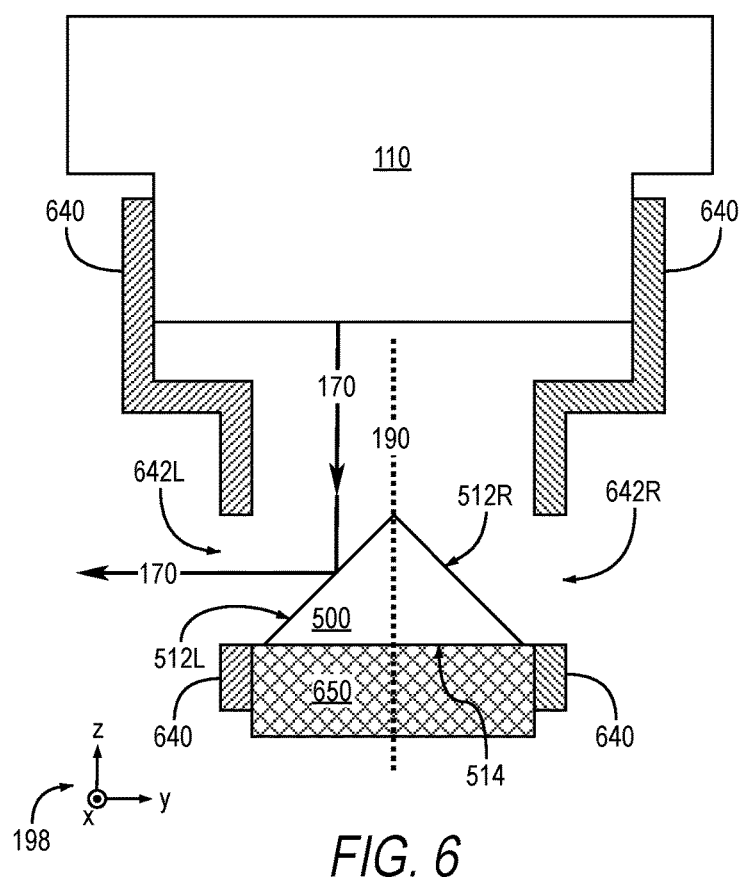
FIG. 6 illustrates a mounting scheme for implementing the FIG. 5 roof reflector in the FIG. 1 apparatus, according to an embodiment.

FIG. 6 illustrates one exemplary mounting scheme 600 for implementing roof reflector 500 in apparatus 100. In scheme 600, apparatus 100 includes a housing 640 and a support 650. Support 650 holds roof reflector 500. Housing 640 couples support 650 to scanner 110 such that roof reflector 500 is contained within housing 640. Here, housing 640 has two apertures 642L and 642R, through which laser beam 170 propagates from roof reflector 500 to workpieces 180L and 180R, respectively.

Laser processing of workpieces 180L and 180R may generate debris. When reflective surfaces 512L and 512R are coated, removal of contaminants may damage the coatings. Scheme 600 may be adapted to prevent debris, and other contaminants, from settling on reflective surfaces 512L and 512R. In one embodiment, each of apertures 642L and 642R is closed by a window (not shown in FIG. 6). In another embodiment, apparatus 100 includes one or more air knives, or other source(s) of gas flow, that help divert contaminants moving towards reflective surfaces 512L and 512R.

Figure 7A:
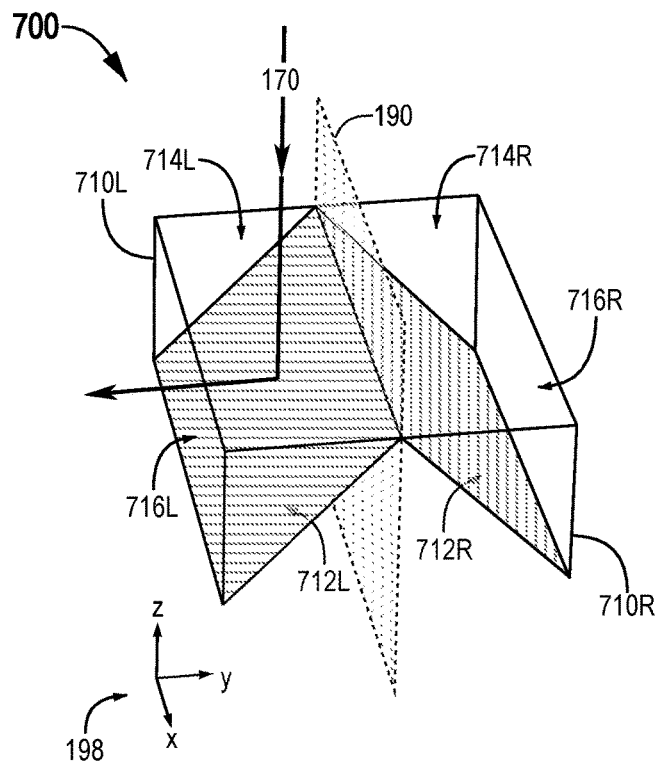
FIGS. 7A and 7B illustrate a roof reflector that reflects the laser beam via total internal reflection, according to an embodiment.
Figure 7B:
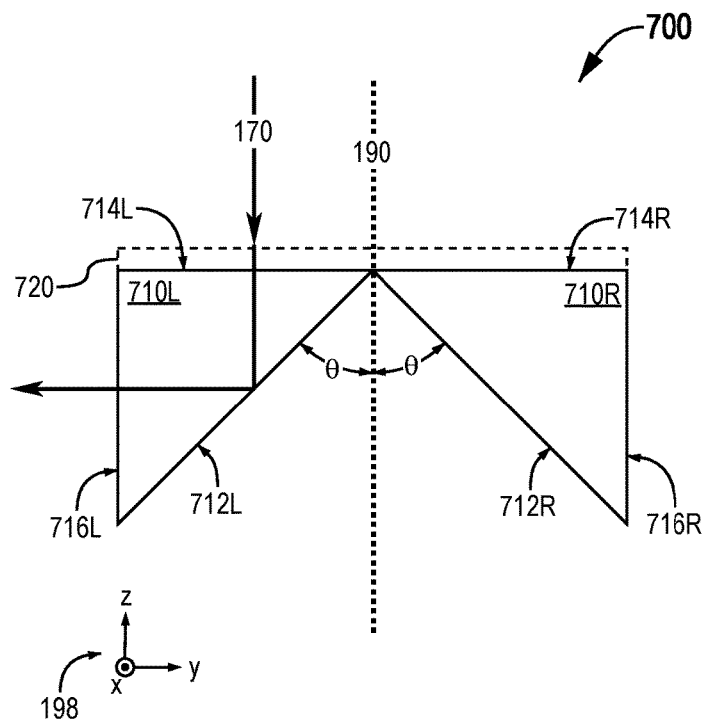

FIGS. 7A and 7B illustrate, in perspective view and sideview, respectively, one roof reflector 700 that reflects laser beam 170 via total internal reflection. Roof reflector 700 is an embodiment of roof reflector 120. Roof reflector 700 includes two right-angle prisms 710L and 710R located on the left and right sides, respectively, of center plane 190. Prism 710L has three lateral faces 712L, 714L, and 716L, and prism 710R has three lateral faces 712R, 714R, and 716R. Faces 714L and 716L are perpendicular to each other, and faces 714R and 716R are perpendicular to each other. In apparatus 100, faces 714L and 714R are orthogonal to center plane 190 and face scanner 110. Faces 716L and 716R are parallel to and face away from center plane 190. Faces 712L and 712R face toward center plane 190 and away from laser beam 170 as incident from scanner 110. In operation, laser beam 170 propagates into prism 710L (or 710R) through face 714L (or 714R), undergoes total internal reflection at face 712L (or 712R) to leave prism 710L (or 710R) via face 716L (or 716R). Some or all of faces 714L, 716L, 714R, and 716R may include an antireflective coating.

Faces 714L and 714R may contact each other at center plane 190. In one embodiment, roof reflector 700 further includes a planar element 720 connected to each of faces 714L and 714R. Planar element 720 may be integrally formed with prisms 710L and 710R, or prisms 710L and 710R may be bonded to planar element 720.

Since the reflection of laser beam 170 by either one of faces 712L and 712R takes place via total internal reflection, there is no need for reflective coatings on faces 712L and 712R. As a result, roof reflector 700 may be able to handle higher laser beam intensities than roof reflectors 400 and 500. (This typically holds true even if some or all of faces 714L, 716L, 714R, and 716R have antireflective coatings, since antireflective coatings usually have higher damage thresholds than high-reflective coatings.) On the other hand, refraction of laser beam 170 when coupling into and out of either one of prisms 710L and 710R may distort beam parameters of laser beam 170. Such refraction may also adversely affect the quality of images captured by camera 264. Thus, while roof reflector 700 may be preferable for laser processing tasks that require relatively high laser power, roof reflectors 400 and 500 may be preferable for laser processing tasks that require high quality of laser beam 170 at the workpieces and/or rely on high-quality imaging thereof.

In roof reflector 700, angle $\theta$ is at most $90°-\theta_c$, where $\theta_c$ is the critical angle for total internal reflection. Depending on the material of prisms 710L and 710R, angle $\theta$ may need to be no greater than, e.g., 50 degrees. Thus, the possible range of angles $\theta$ may be more limited in roof reflector 700 than in roof reflectors 400 and 500.

Figure 8:
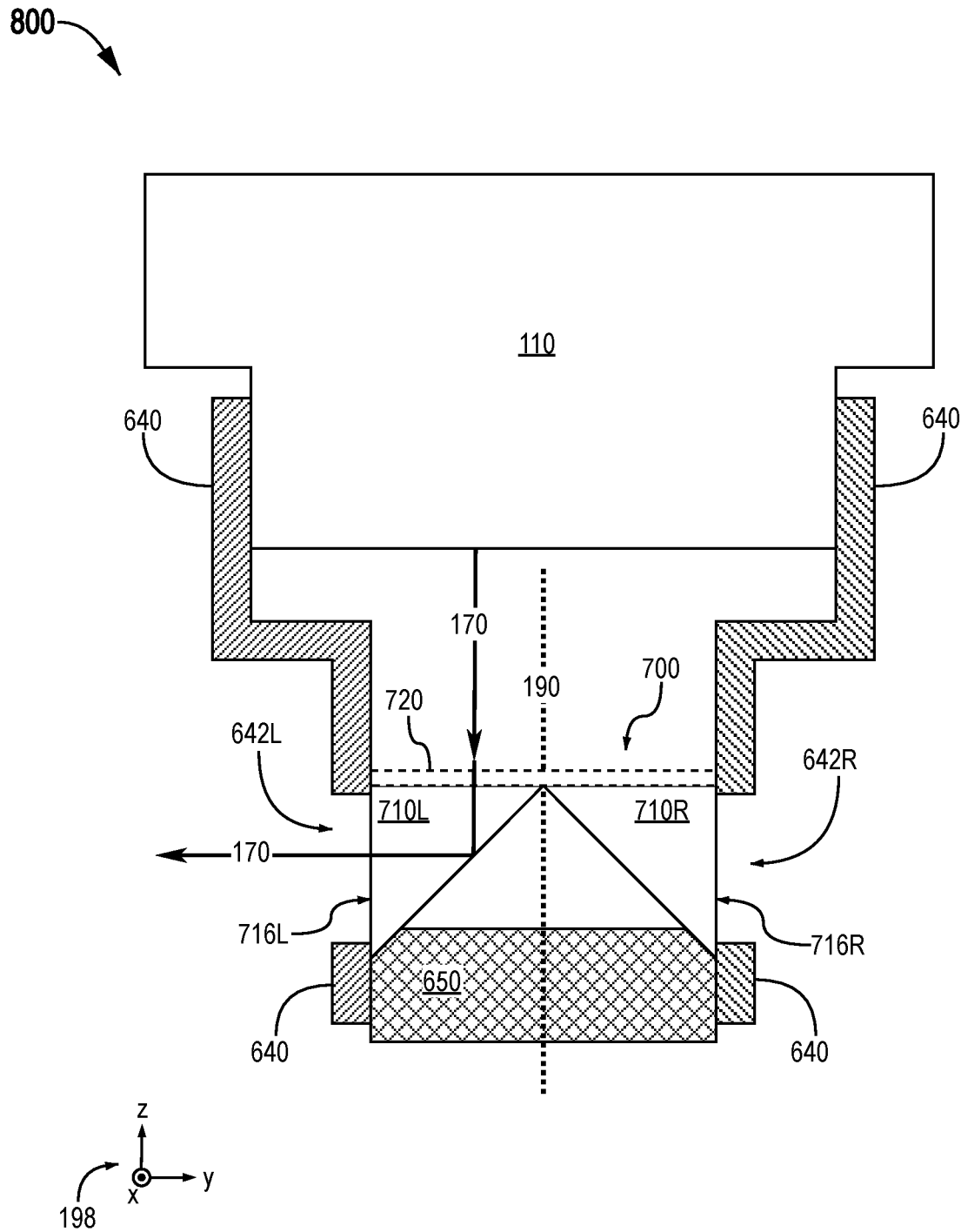
FIG. 8 illustrates a configuration for implementing the FIG. 7 roof reflector in the FIG. 1 apparatus, according to an embodiment.

FIG. 8 illustrates one exemplary mounting scheme 800 for implementing roof reflector 700 in apparatus 100. Scheme 800 is similar to scheme 600, except that (a) housing 640 and support 650 may be adapted to the shape of roof reflector 700, and (b) faces 716L and 716R close apertures 642L and 642R. Faces 716L and 716R do not require reflective coatings and are therefore more amenable to cleaning than reflective surfaces 512L and 512R of roof reflector 500.

In an extension of the embodiments discussed above, roof reflector 120 may have focusing power. For example, reflective surfaces 512L and 512R of roof reflector 500 may have some degree of curvature, and one or more lateral faces of each of prisms 710L and 710R of roof reflector 700 may be curved.

The present invention is described above in terms of a preferred embodiment and other embodiments. The invention is not limited, however, to the embodiments described and depicted herein. Rather, the invention is limited only by the claims appended hereto.

What is claimed is:

1. A scanning laser apparatus for alternately addressing two workstations, comprising:
    a two-dimensional laser beam scanner for steering a propagation direction of a laser beam within a field of view of the laser beam scanner; and
    a roof reflector positioned to intercept the laser beam steered by the laser beam scanner, the roof reflector including a roof ridge and first and second reflective surfaces positioned on first and second sides, respectively, of a center plane of the roof reflector coinciding with the roof ridge, the center plane dividing the field of view into first and second field-of-view portions so as to allow said steering of the laser beam to direct the laser beam to either the first or the second reflective surface, each of the first and second reflective surfaces being oriented to reflect the laser beam away from the center plane;
    wherein the laser beam scanner is configured to adjust the propagation direction of the laser beam, as incident on the roof reflector, in dimensions both parallel and perpendicular to the center plane.

2. The scanning laser apparatus of claim 1, wherein each of the first and second reflective surfaces is planar.

3. The scanning laser apparatus of claim 1, wherein each of the first and second reflective surfaces is oriented at an oblique angle to the center plane, the oblique angle having the same value for each of the first and second reflective surfaces.

4. A dual-workstation scanning laser apparatus, comprising:
    the scanning laser apparatus of claim 1;
    a first workstation for holding a first workpiece on the first side of the center plane in a propagation path of the laser beam after reflection by the first reflective surface; and
    a second workstation for holding a second workpiece on the second side of the center plane in a propagation path of the laser beam after reflection by the second reflective surface.

5. The dual-workstation scanning laser apparatus of claim 4, wherein each of the first and second workstations further includes a motorized rotation stage for rotating a corresponding one of the first and second workpieces about an axis that is parallel to the center plane and perpendicular to a central propagation direction of the laser beam as propagating toward the roof reflector.

6. The scanning laser apparatus of claim 1, wherein the first and second reflective surfaces of the roof reflector face away from the center plane and toward the laser beam as incident from the laser beam scanner.

7. The scanning laser apparatus of claim 6, wherein the first and second reflective surfaces have a reflective coating.

8. The scanning laser apparatus of claim 1, wherein the roof reflector is a triangular prism having three lateral faces, two of the three lateral faces including a reflective coating to form the first and second reflective surfaces.

9. The scanning laser apparatus of claim 1, wherein the first and second reflective surfaces of the roof reflector face toward the center plane and away from the laser beam as incident from the laser beam scanner, the first and second reflective surfaces being arranged to reflect the laser beam by total internal reflection.

10. The scanning laser apparatus of claim 9, wherein each of the first and second reflective surfaces is oriented at an oblique angle to the center plane, the oblique angle being at most 90 degrees minus a critical angle for total internal reflection.

11. The scanning laser apparatus of claim 1, wherein the roof reflector includes first and second right-angle prisms each having (a) first and second lateral faces oriented at a right angle to each other and (b) a third lateral face that is opposite the right angle and faces toward the center plane and away from the laser beam as incident from the laser beam scanner, the third lateral face of the first right-angle prism forming the first reflective surface, the third lateral face of the second right-angle prism forming the second reflective surface.

12. The scanning laser apparatus of claim 11, wherein each of the first and second reflective surfaces are configured to reflect the laser beam, when incident thereon, by total internal reflection.

13. The scanning laser apparatus of claim 11, wherein, for each of the first and second right-angle prisms, the first lateral face is perpendicular to the center plane and the second lateral face is parallel to the center plane.

14. The scanning laser apparatus of claim 11, wherein, for each of the first and second right-angle prisms, the first and second lateral faces have an antireflective coating.

15. The scanning laser apparatus of claim 1, wherein each of the first and second reflective surfaces is oriented at an oblique angles, respectively, to the center plane, the oblique angle being between 40 and 50 degrees.

16. The scanning laser apparatus of claim 1, wherein each of the first and second reflective surfaces is oriented at an oblique angles, respectively, to the center plane, the oblique angle being between 25 and 35 degrees.

17. The scanning laser apparatus of claim 1, wherein the laser beam scanner includes an objective for focusing the laser beam, an optical axis of the objective being coplanar with the center plane.

18. A scanning laser processing method for alternately addressing two workstations, comprising steps of:
   directing a laser beam to a first reflective surface of a roof reflector, the first reflective surface being positioned on a first side of a center plane of the roof reflector, the center plane coinciding with a roof ridge of the roof reflector, the first reflective surface reflecting the laser beam away from the center plane to irradiate a first workpiece mounted in a first workstation on the first side of the center plane;
   while directing the laser beam to the first reflective surface, varying the propagation direction of the laser beam toward the roof reflector, both parallel and orthogonally to the center plane, to scan at least a portion of the first workpiece with the laser beam;
   after directing the laser beam to the first reflective surface, directing the laser beam to a second reflective surface of the roof reflector, the second reflective surface being positioned on a second side of the center plane, the second reflective surface reflecting the laser beam away from the center plane to irradiate a second workpiece mounted in a second workstation on the second side of the center plane; and
   while directing the laser beam to the second reflective surface, varying the propagation direction of the laser beam toward the roof reflector, both parallel and orthogonally to the center plane, to scan at least a portion of the second workpiece with the laser beam.

19. The scanning laser processing method of claim 18, further comprising at least one of (a) while directing the laser beam to the first reflective surface to irradiate the first workpiece, loading the second workpiece into the second workstation or repositioning the second workpiece in the second workstation, and (b) while directing the laser beam to the second reflective surface to irradiate the second workpiece, removing the first workpiece from the first workstation or repositioning the first workpiece in the first workstation.

20. The scanning laser processing method of claim 18, wherein the first and second workpieces are elongated along a respective axis that is parallel to the center plane and perpendicular to a central propagation direction of the laser beam as propagating toward the roof reflector.

21. The scanning laser processing method of claim 20, further comprising steps of:
   while directing the laser beam to the first reflective surface, rotating the first workpiece about its axis of elongation; and
   while directing the laser beam to the second reflective surface, rotating the second workpiece about its axis of elongation.

* * * * *